UNITED STATES PATENT OFFICE.

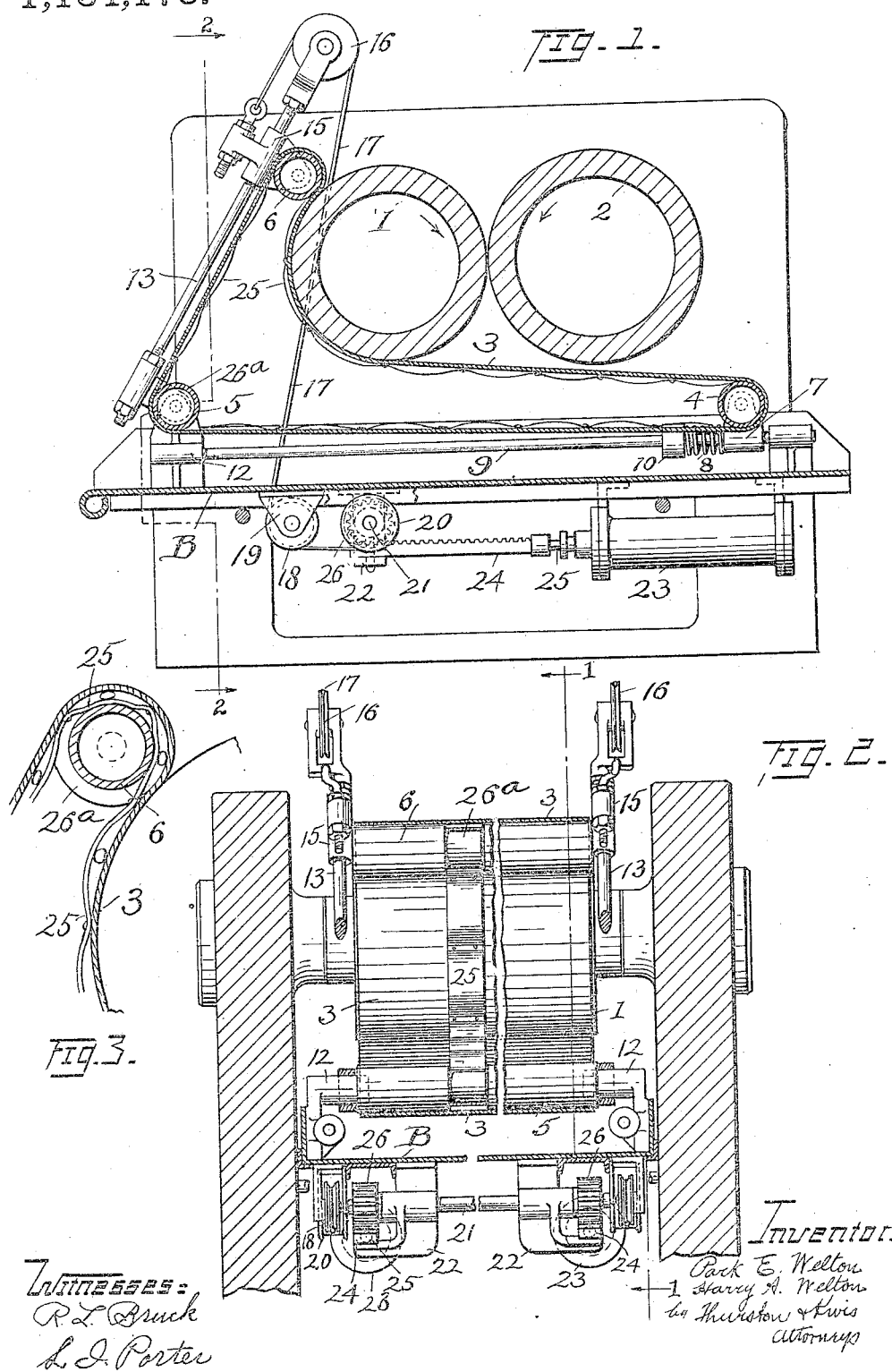

PARK E. WELTON AND HARRY A. WELTON, OF AKRON, OHIO, ASSIGNORS TO KATHARINE B. WELTON, OF AKRON, OHIO.

FEED MECHANISM FOR MIXING-MILLS.

1,134,173. Specification of Letters Patent. Patented Apr. 6, 1915.

Application filed November 3, 1913. Serial No. 798,803.

*To all whom it may concern:*

Be it known that we, PARK E. WELTON and HARRY A. WELTON, citizens of the United States, and residents of Akron, in the county of Summit and State of Ohio, have invented a certain new and useful Improvement in Feed Mechanism for Mixing-Mills, of which the following is a full, clear, and exact description.

When endless feed aprons are employed in connection with the mixing rolls of a mixing mill, it is not only desirable that the mechanism associated with the apron shall be capable of so controlling its position that it will repeatedly return to the mixing rolls the material which passes between them, but it is also desirable that this mechanism be such that, when any batch of material has been satisfactorily mixed, the apron and its associated mechanism may be moved into such positions as will facilitate the removal of such mixed material.

This invention resides in the novel mechanism shown in the drawing and hereinafter described and claimed, which when combined with an endless feed apron will produce the desirable results above mentioned.

In the drawings, Figure 1 is a vertical section on the plane indicated by the line 1—1 on Fig. 2 of a mixing mill to which the present invention is applied; Fig. 2 is a sectional end elevation on the plane indicated by the line 2—2 on Fig. 1. Fig. 3 is an enlarged sectional view of the grooved part of the roll 6, the section being at right angles to the axis of the roll and showing also a part of the feed apron and a part of the adjacent mixing roll.

Referring to the parts by reference characters, 1 and 2 represent the mixing rolls of an ordinary rubber mixing mill. No attempt has been made to show the mechanism by which these rolls are turned, because that is no part of the present invention. It must be assumed, however, that suitable mechanism is associated with these rolls to cause them to turn at the proper rate in the direction indicated by the arrows placed adjacent to said rolls in Fig. 1.

In order that any rubber mixing mill may be quickly equipped with this invention, the apron and the mechanism associated therewith are all mounted and supported on a pan B which may be secured to the mixing mill frame work beneath the mixing rolls.

The endless feed apron 3 runs over three rolls 4, 5 and 6, whose axes are parallel with the axes of the mixing rolls, and said rolls are so mounted that they may assume the operating position relative to mixing rolls which is shown in Fig. 1, whereby the apron is held against one of the mixing rolls, and is caused to travel at substantially the same surface speed. The roll 4 is mounted in bearing pieces 7, which preferably are mounted slidably on the pan, and are under the influence of springs 8 which act to yieldingly stretch the belt. Specifically, these bearing pieces are in the form of sleeves which embrace rods 9, which are fixed to the pan; and the springs 8 are located between these sleeves and collars 10 on said rods. The roll 5 is mounted in bearing brackets 12 which are fixed to the pan. Two swinging arms 13 are pivoted to these same brackets on an axis which is substantially coincident with the axis of the roll 5, and extend therefrom upward at an angle toward the mixing roll 1. On each of these arms a sleeve 15 is slidably mounted, and these sleeves are so constructed that the roll 6 is rotatively mounted in them at its ends.

At the upper end of each arm 13, a sheave 16 is mounted. A cable 17 is fixed to each sleeve 15 and extends upward over sheave 16, and thence down to a guide sheave 18 mounted in brackets 19 which are secured to the under side of the pan. These two cables are wound respectively on two drums 20, which are fixed to a shaft 21,—said shaft being mounted in brackets 22 which are fixed to the under side of the pan.

Two fluid pressure cylinders 23 are fixed to the under side of the pan. A rack 24 is fixed to the piston rod 25 of each of those cylinders. The racks are supported by the brackets 22, and each engages with a pinion 26 which is fixed to shaft 21.

By admitting compressed air or steam to the left end of these cylinders, the winding drums 20 are turned so as to wind up the cables 17, and this will draw up the two bracket sleeves 15, and thereby pull the feed apron against the mixing roll 1; and also the arms 13 will be swung toward said mixing roll, so as to cause the feed apron to wrap itself around said mixing roll to the extent permitted by the length of the apron.

When the mixed material is to be removed, the winding drums are turned in the reverse direction by the racks and fluid pressure cylinder, and the two arms 13 and parts carried thereby are swung to the left (as shown in Fig. 1), to any desired position.

It is essential that, to get the best results, the guide sheaves 18 shall be fairly near to the pivots of the arms 13,—so that the pull of the cables upon said arms shall not be at a very great angle to the arms. In fact, the heavier and lumpier the material which is being mixed, the nearer should these cables be to the axis of said arms. This gives to the arms and the roll mounted in them, the necessary freedom of motion, as the lumpy material is being covered by the apron between it and the mixing roll.

Some sort of a guide to keep the apron from being moved endwise of the supporting rolls by the peculiar action of the different sized lumps of material is necessary. To accomplish this result, a narrow strip 25 of suitable material, such as leather or flexible chain is secured to the inner surface of the belt, and each of the three feed rolls is formed with a circumferential groove 26ª in its periphery for the reception of this guide strip. We have found, however, that it will not do to apply this guide strip flat or in a stretched condition. The aprons which are used are made of canvas or rubber belting,—and this will be stretched by use, and it will not do to secure this guide strip so that it will interfere with the even stretching of said apron. Therefore this guide strip is secured at short intervals to the apron so that between those points of connection, the guide strip is loose or looped. When so secured it makes rather a better guide strip, than it would if it were laid flat against the apron in the first instance; and it does not interfere with stretching of the apron.

Having thus described our invention what we claim is:

1. In combination with the mixing rolls of a mixing mill, an endless feed apron therefor, three rolls over which said apron runs,—two of said rolls being located in planes below the mixing rolls,—two pivoted arms which when in operative position extend upward at an angle toward the mixing rolls, two bracket sleeves which are slidably mounted on said arms,—the third apron roll being extended between and mounted on these bracket sleeves, and means for drawing said bracket sleeves upward on said arms and for swinging said arms toward the mixing rolls.

2. In combination with the mixing rolls of a mixing mill, an endless feed apron therefor, three rolls over which said apron runs,—two of said rolls being located in planes below the mixing rolls,—two pivoted arms which when in operative position extend upward at an angle toward the mixing rolls, two bracket sleeves which are slidably mounted on said arms,—the third apron roll being extended between and mounted on these bracket sleeves, sheaves mounted upon the upper ends of said arms, winding drums, and cables which are fixed to said bracket sleeves and extend over said sheaves and are wound upon said drums.

3. In combination with the mixing rolls of a mixing mill, an endless feed apron therefor, three rolls over which said apron runs,—two of said rolls being located in planes below the mixing rolls,—two pivoted arms which when in operative position extend upward at an angle toward the mixing rolls, two bracket sleeves which are slidably mounted on said arms,—the third apron roll being extended between and mounted on these bracket sleeves, sheaves mounted on the upper end of said arms, guide sheaves located adjacent to the pivots of said arms but between said pivots and the mixing rolls, cables which are fixed to said bracket sleeves and extend over the sheaves on the ends of the arms, and under the other sheaves, and winding drums upon which said cables may be wound.

4. In combination with the mixing rolls of a mixing mill, and a supporting member which is removably secured beneath said mixing rolls, and the following coöperating parts which are supported by said removable supporting member, viz: two guide rods located below the mixing rolls and extending in directions at right angles to the axes of said rolls, two brackets slidably mounted on said rods near one end thereof, an apron roll which extends between and is mounted in said brackets, springs acting to yieldingly resist the movement of said brackets toward the opposite ends of said guide rods, a second apron roll which is parallel with the first mentioned roll and is mounted near the opposite ends of said guide rods, two arms pivoted on axes which are substantially coincident with the axis of the last mentioned apron roll, two bracket sleeves which are slidably mounted on said arms, a third apron which extends between and is mounted in said bracket sleeves, sheaves on the upper ends of said arms, cables fixed to said bracket sleeves and extending over said sheaves and downward therefrom, guide sheaves under which said cables run, means for taking in and paying out said cables, and an endless feed apron which runs around the three apron rolls specified.

5. In combination with the mixing rolls of a mixing mill, three apron rolls, two of which are located in planes below the mixing rolls, two pivoted arms in which the other apron roll is mounted, means for swinging said arms toward the adjacent mixing roll,—each of said rolls having a circumferential groove in its periphery, and a stretchable feed apron which embraces and runs over all of said feed rolls, said apron having secured at intervals to its inner face a guide strip adapted to run in said circumferential grooves, the said guide strip between the points at which it is connected with the belt being arranged in loose loops.

6. In combination with the mixing rolls of a mixing mill, an endless feed apron therefor, three rolls over which said apron runs,—two of said rolls being located in planes below the mixing rolls,—two pivoted arms which, when in operative position, extend upward at an angle toward the mixing rolls, two bearing brackets which are slidably mounted on said arms,—the third apron roll being extended between and mounted in said bearing brackets, and means for independently applying yielding pressure to said bearing brackets to move them upward upon their supporting arms.

In testimony whereof, we hereunto affix our signatures in the presence of two witnesses.

PARK E. WELTON.
HARRY A. WELTON.

Witnesses:
L. I. PORTER,
A. J. HUDSON.

Copies of this patent may be obtained for five cents each, by addressing the "Commissioner of Patents, Washington, D. C."